US010398169B2

(12) United States Patent
Nelson et al.

(10) Patent No.: US 10,398,169 B2
(45) Date of Patent: Sep. 3, 2019

(54) E-VAPOR DEVICE INCLUDING AT LEAST ONE OF A BAYONET CONNECTOR AND A CONNECTOR WITH A KNURLED PATTERN FOR FORMING A WELDED JUNCTION

(71) Applicant: Altria Client Services LLC, Richmond, VA (US)

(72) Inventors: Gregory L. Nelson, Richmond, VA (US); Geoffrey Brandon Jordan, Midlothian, VA (US); Charles L. Dendy, Richmond, VA (US); Bipin Patil, Richmond, VA (US); Sean Sundberg, Richmond, VA (US); Jerome Fleenor, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 450 days.

(21) Appl. No.: 15/190,769

(22) Filed: Jun. 23, 2016

(65) Prior Publication Data
US 2016/0374396 A1   Dec. 29, 2016

Related U.S. Application Data

(60) Provisional application No. 62/184,544, filed on Jun. 25, 2015, provisional application No. 62/184,550, filed on Jun. 25, 2015.

(51) Int. Cl.
*A61M 15/06* (2006.01)
*A24F 47/00* (2006.01)
(Continued)

(52) U.S. Cl.
CPC ............ *A24F 47/008* (2013.01); *B29C 65/08* (2013.01); *B29C 66/3032* (2013.01);
(Continued)

(58) Field of Classification Search
None
See application file for complete search history.

(56) References Cited

U.S. PATENT DOCUMENTS 2,987,691 A * 6/1961 Ross ............... H01R 13/625
                                              439/294
3,437,093 A   4/1969 Williamson et al.
(Continued)

FOREIGN PATENT DOCUMENTS

CN        103416853 A      12/2013
CN        203378563 U       1/2014
(Continued)

OTHER PUBLICATIONS

International Preliminary Report for Application No. PCT/US2016/038960 dated Jan. 4, 2018.
(Continued)

*Primary Examiner* — Thor S Campbell
(74) *Attorney, Agent, or Firm* — Harness, Dickey & Pierce, P.L.C.

(57) ABSTRACT

An e-vapor device may include a vaporizer assembly that is detachably coupled to a battery assembly via a connector. The connector may include a male connecting portion and a female connecting portion. The male connecting portion may include mating arms extending from a rim of the male connecting portion. The female connecting portion may include an inner surface and lugs on the inner surface. The mating arms of the male connecting portion are configured to engage the lugs of the female connecting portion so as to electrically couple the vaporizer assembly and the battery assembly. A knurled pattern may also be provided on an outer surface of the male connecting portion and/or female connecting portion so as to conformally interface with a
(Continued)

reversed pattern on an inner surface of the vaporizer assembly and/or the battery assembly.

13 Claims, 19 Drawing Sheets

(51) Int. Cl.
    *B29C 65/08*         (2006.01)
    *B29C 65/00*         (2006.01)
    *H01R 13/625*      (2006.01)
    *H01R 24/00*        (2011.01)
    *H01R 101/00*      (2006.01)

(52) U.S. Cl.
    CPC ........ *B29C 66/5221* (2013.01); *B29C 66/742* (2013.01); *H01R 13/625* (2013.01); *H01R 24/005* (2013.01); *H01R 2101/00* (2013.01)

(56) References Cited

U.S. PATENT DOCUMENTS

| | | | | |
|---|---|---|---|---|
| 3,538,485 | A * | 11/1970 | Hennessey, Jr. | H01R 13/635 285/316 |
| 3,756,900 | A | 9/1973 | Michel et al. | |
| 3,876,234 | A * | 4/1975 | Harms | A61M 39/10 285/38 |
| 3,966,340 | A * | 6/1976 | Morris | F16B 12/22 403/353 |
| 4,396,038 | A * | 8/1983 | Soutsos | B65D 59/06 138/96 T |
| 4,427,485 | A | 1/1984 | Kutnyak et al. | |
| 4,731,521 | A * | 3/1988 | Spector | A61L 9/03 219/260 |
| 5,011,555 | A | 4/1991 | Sager | |
| 5,385,138 | A * | 1/1995 | Berry | A61B 1/00193 359/368 |
| 5,431,580 | A | 7/1995 | Tabata | |
| 6,095,136 | A * | 8/2000 | Virtanen | A61M 15/0065 128/200.18 |
| 6,328,032 | B1 * | 12/2001 | Virtanen | A61M 15/0065 128/203.15 |
| 6,598,435 | B2 * | 7/2003 | Cowan | E05B 35/008 411/549 |
| 7,666,541 | B2 | 2/2010 | Makovetski et al. | |
| 8,603,034 | B2 * | 12/2013 | Lynch | A61M 5/14244 604/131 |
| 8,833,418 | B2 | 9/2014 | Or | |
| 8,882,946 | B2 | 11/2014 | Bang et al. | |
| 9,999,252 | B2 * | 6/2018 | Liu | A24F 47/008 |
| 2003/0219602 | A1 | 11/2003 | Kagan | |
| 2007/0274772 | A1 * | 11/2007 | Tiberghien | F16L 37/107 403/300 |
| 2011/0152781 | A1 * | 6/2011 | Brunnberg | A61M 5/3129 604/189 |
| 2011/0248069 | A1 | 10/2011 | Khakhalev et al. | |
| 2011/0319915 | A1 * | 12/2011 | Viola | A61B 17/00234 606/151 |
| 2012/0006810 | A1 | 1/2012 | Fan et al. | |
| 2013/0152922 | A1 * | 6/2013 | Benassayag | A61M 15/06 128/202.21 |
| 2013/0213552 | A1 | 8/2013 | Kelch et al. | |
| 2014/0150783 | A1 | 6/2014 | Liu | |
| 2014/0261493 | A1 | 9/2014 | Smith et al. | |
| 2014/0373833 | A1 | 12/2014 | Liu | |
| 2015/0013701 | A1 | 1/2015 | Liu | |
| 2015/0020827 | A1 | 1/2015 | Liu | |
| 2015/0027461 | A1 | 1/2015 | Liu | |
| 2015/0027464 | A1 | 1/2015 | Liu | |
| 2015/0027467 | A1 | 1/2015 | Liu | |
| 2015/0034107 | A1 | 2/2015 | Liu | |
| 2015/0059784 | A1 | 3/2015 | Liu | |
| 2016/0073692 | A1 * | 3/2016 | Alarcon | A24F 47/008 131/329 |
| 2017/0035117 | A1 * | 2/2017 | Lin | A24F 47/00 |
| 2017/0150754 | A1 * | 6/2017 | Lin | A24F 47/00 |

FOREIGN PATENT DOCUMENTS

| | | |
|---|---|---|
| CN | 203446531 U | 2/2014 |
| CN | 203873003 U | 10/2014 |
| CN | 203913391 U | 11/2014 |
| CN | 204048036 U | 12/2014 |
| CN | 104323430 A | 2/2015 |
| CN | 104351947 A | 2/2015 |
| EP | 2835063 A1 | 2/2015 |
| GB | 2511305 A | 9/2014 |
| WO | WO-2015010242 A1 | 1/2015 |
| WO | WO-2015010277 A1 | 1/2015 |
| WO | WO-2015013890 A1 | 2/2015 |
| WO | WO-2015013891 A1 | 2/2015 |
| WO | WO-2015054885 A1 | 4/2015 |

OTHER PUBLICATIONS

Invitation to Pay Additional Fees issued in International Patent Application No. PCT/US2016/038960, dated Oct. 7, 2016.

"Smoking Vaporizer Electronic Cigarette Joyetech eRoll with PCC Design", Cotan Product Description, 2014.

Geoff Shannon, et al., "Green lasers for laser micro welding", Industrial Laser Solutions for Manufacturing, Jul. 1, 2011, pp. 1-14.

* cited by examiner

E-VAPOR DEVICE INCLUDING AT LEAST ONE OF A BAYONET CONNECTOR AND A CONNECTOR WITH A KNURLED PATTERN FOR FORMING A WELDED JUNCTION

CROSS-REFERENCE TO RELATED APPLICATIONS

The present application claims priority under 35 U.S.C. § 119 to U.S. Provisional Application No. 62/184,544, filed Jun. 25, 2015, and U.S. Provisional Application No. 62/184,550, filed Jun. 25, 2015, the entire contents of each of which are hereby incorporated herein by reference.

BACKGROUND

Field

The present disclosure relates to electronic vapor devices and connectors for such devices.

Description of Related Art

Electronic vapor devices are electrically-powered articles configured to heat a pre-vapor formulation for the purpose of producing a vapor when a negative pressure is applied. Electronic vapor devices may also be referred to as e-vapor devices or e-vaping devices. Some e-vapor devices include a first section that is coupled to a second section via a threaded connection. The first section may be a replaceable cartridge, and the second section may be reusable. The threaded connection may be a combination of a male threaded member on the first section and a female threaded receiver on the second section. The first section may include an outer tube (or housing) extending in a longitudinal direction and an inner tube within the outer tube. The inner tube may be coaxially positioned within the outer tube. The second section may also include the outer tube (or housing) extending in a longitudinal direction. The e-vapor device may include a central air passage defined in part by the inner tube and an upstream seal. Additionally, the e-vapor device includes a reservoir. The reservoir is configured to hold a pre-vapor formulation and optionally a storage medium operable to store the pre-vapor formulation therein. The reservoir may be contained in an outer annulus between the outer tube and the inner tube. The outer annulus is sealed by the seal at an upstream end and by a stopper at a downstream end so as to prevent leakage of the pre-vapor formulation from the reservoir.

SUMMARY

An e-vapor device may include a vaporizer assembly, a battery assembly, a male connecting portion secured to one of the vaporizer assembly and the battery assembly, and a female connecting portion secured to the other of the vaporizer assembly and the battery assembly. The vaporizer assembly is configured to heat a pre-vapor formulation to generate a vapor. The battery assembly is configured to power the vaporizer assembly. The male connecting portion may include a pair of mating arms extending from a rim of the male connecting portion. The pair of mating arms and the rim define a pair of angled slots therebetween. A terminus of each of the pair of angled slots includes an enlarged socket end. The female connecting portion may include an inner surface and a pair of lugs on the inner surface. The female connecting portion is configured to longitudinally and rotationally receive the pair of mating arms of the male connecting portion so as to engage each of the pair of lugs of the female connecting portion within the enlarged socket end of each of the pair of angled slots of the male connecting portion to electrically couple the vaporizer assembly and the battery assembly.

The pair of mating arms of the male connecting portion are shaped to correspond to contours of the inner surface of the female connecting portion. In addition, the pair of mating arms of the male connecting portion may have tapered ends. The pair of mating arms are configured to undergo a resilient deformation from an original position to a flexed position that is away from the rim of the male connecting portion when the pair of lugs of the female connecting portion are being rotationally engaged with the pair of angled slots of the male connecting portion. Conversely, the pair of mating arms of the male connecting portion are configured to resiliently return to the original position when the pair of lugs of the female connecting portion are seated within the enlarged socket end of each of the pair of angled slots of the male connecting portion.

The pair of angled slots of the male connecting portion may be L-shaped slots. Each of the pair of angled slots may include a vertical section and a horizontal section, the horizontal section including an entrance end with a first height and the enlarged socket end with a second height, the second height being greater than the first height. The first height of the entrance end of the horizontal section of each of the pair of angled slots of the male connecting portion is less than a height of the pair of lugs of the female connecting portion. The second height of the enlarged socket end of the horizontal section of each of the pair of angled slots of the male connecting portion may correspond to a height of the pair of lugs of the female connecting portion. Each of the pair of angled slots may transition to the enlarged socket end via a concave arc on an underside of each of the pair of mating arms.

The male connecting portion and the female connecting portion are formed of a conductive material. The male connecting portion and the female connecting portion are also monolithic structures. The male connecting portion and the female connecting portion may each be formed from a single piece of brass. The pair of lugs may be arranged on opposite sides of the inner surface of the female connecting portion. Each of the pair of lugs may have a polygonal cross-section.

The male connecting portion and the female connecting portion may be cathodes. The e-vapor device may further include a male anode within the male connecting portion; a male insulating member electrically isolating the male anode from the male connecting portion; a female anode within the female connecting portion; and a female insulating member electrically isolating the female anode from the female connecting portion. The pair of mating arms of the male connecting portion may be configured to compress the female insulating member when the pair of lugs of the female connecting portion are engaged with the pair of angled slots of the male connecting portion. The female anode may include a longitudinally-extending through hole with a diameter that is sufficiently small to permit a passage of air while precluding a passage of the pre-vapor formulation.

A double bayonet connector for an e-vapor device may include a male connecting portion and a female connecting portion. The male connecting portion may include a pair of mating arms extending from a rim of the male connecting portion. The pair of mating arms and the rim define a pair of angled slots therebetween. A terminus of each of the pair of angled slots includes an enlarged socket end. The female connecting portion may include an inner surface and a pair of lugs on the inner surface. The female connecting portion is configured to longitudinally and rotationally receive the pair of mating arms of the male connecting portion so as to engage each of the pair of lugs of the female connecting portion within the enlarged socket end of each of the pair of angled slots of the male connecting portion.

An e-vapor device may include a body section and a connector section secured to the body section via a welded junction. The body section may include a vaporizer assembly and a battery assembly. The connector section may include a male connecting portion and a female connecting portion. In addition, the connector section may be formed of a conductive material. The welded junction may include a knurled pattern on an outer surface of the connector section that conformally interfaces with a reversed pattern on an inner surface of the body section. In a non-limiting embodiment, the knurled pattern may be on the outer surface of the female connecting portion of the connector section.

The knurled pattern may be made of a series of straight ridges. Additionally, the knurled pattern may include between 40 to 60 teeth per inch (TPI). Furthermore, the knurled pattern may have a depth between 0.2 to 0.4 mm. The knurled pattern may be in a form of at least one annular band that circumscribes a sidewall of the connector section. For example, the knurled pattern may include a first knurling, a second knurling, and a plain, segment that spaces the first knurling away from the second knurling. The plain segment may be an unridged, circular region that separates the first knurling from the second knurling. The welded junction is configured to withstand a tensile force of at least 250 N.

The knurled pattern has a higher melting point than the reversed pattern on the inner surface of the body section. For instance, the reversed pattern on the inner surface of the body section may be formed of plastic. In an example embodiment, the plastic has been resolidified from a molten state so as to take on contours of the knurled pattern on the outer surface of the connector section.

A method of manufacturing an e-vapor device may include welding a connector section to a body section of the e-vapor device to form a welded junction. The welded junction may include a knurled pattern on an outer surface of the connector section that conformally interfaces with a reversed pattern on an inner surface of the body section. The welding may be such that a material of the reversed pattern resolidifies from a molten state so as to take on contours of the knurled pattern.

A connector for an e-vapor device may include a hollow body with a knurled pattern on an outer surface of the hollow body. The knurled pattern may be in a form of at least one annular band that circumscribes a sidewall of the hollow body. The connector may be a monolithic structure.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
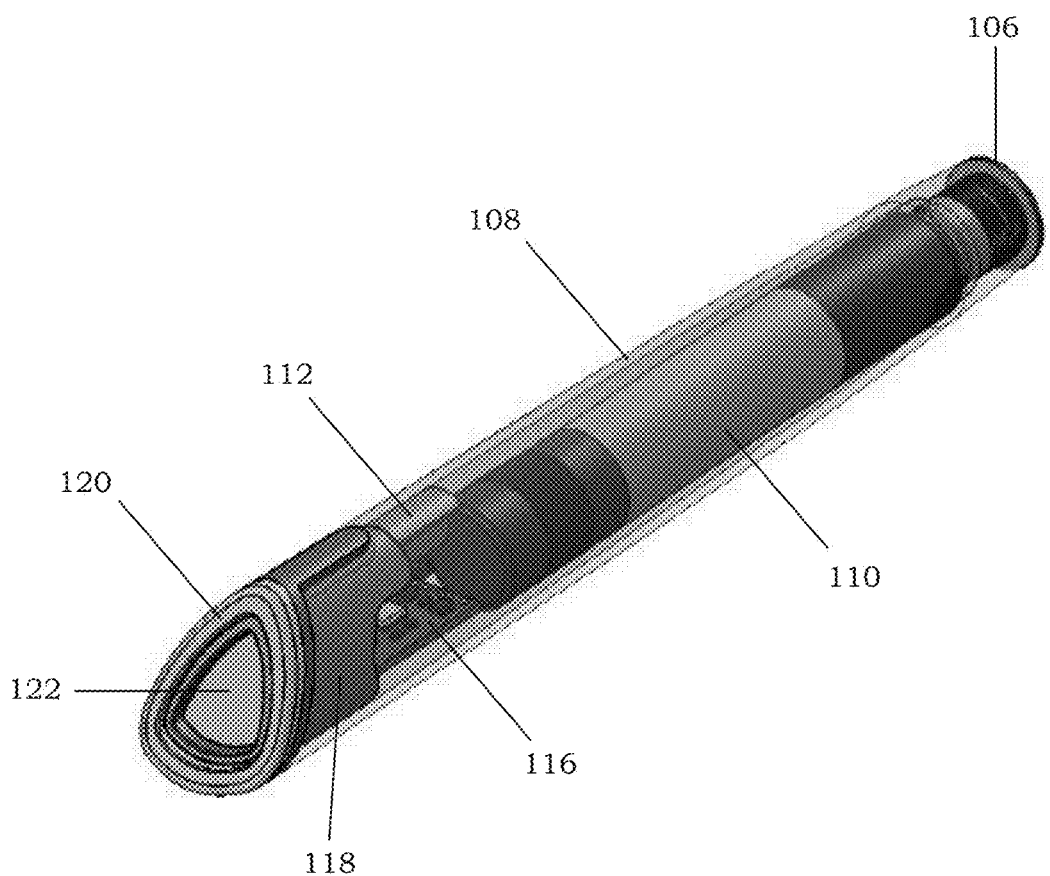
FIG. 1 is a semi-transparent view of a battery assembly of an e-vapor device according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited, to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

In an example embodiment, an e-vapor device may include a body section and a connector section that is secured to the body section via a welded junction. The body section may include at least one of a vaporizer assembly and a battery assembly. The welded junction may include a knurled pattern on an outer surface of the connector section that conformally interfaces with a reversed pattern on an inner surface of the body section. Conversely, the welded junction may include a knurled pattern on an inner surface of the connector section that conformally interfaces with a reversed pattern on an outer surface of the body section. The connector section may include a male connecting portion and a female connecting portion. In such a non-limiting embodiment, the female connecting portion may be secured to the battery assembly via a welded junction.

In another example embodiment, an e-vapor device may include a vaporizer assembly, a battery assembly, and a connector that joins the vaporizer assembly to the battery assembly. The vaporizer assembly is configured to heat a pre-vapor formulation to generate a vapor. A pre-vapor formulation is a material or combination of materials that may be transformed into a vapor. For example, the pre-vapor formulation may be a liquid, solid, and/or gel formulation including, but not limited to, water, beads, solvents, active ingredients, ethanol, plant extracts, natural or artificial flavors, and/or vapor formers such as glycerine and propylene glycol. The battery assembly is configured to power the vaporizer assembly. The connector may include a male connecting portion and a female connecting portion. The male connecting portion may be secured to one of the vaporizer assembly and the battery assembly. The male connecting portion may include a pair of mating arms extending from a rim of the male connecting portion. The pair of mating arms and the rim may define a pair of angled slots therebetween. A terminus of each of the pair of angled slots includes an enlarged socket end. The female connecting portion is secured to the other of the vaporizer assembly and the battery assembly. For example, when the male connecting portion is secured to the vaporizer assembly, the female connecting portion is secured to the battery assembly (and vice versa). The female connecting portion may include an inner surface and a pair of lugs on the inner surface. The female connecting portion is configured to longitudinally and rotationally receive the pair of mating arms of the male connecting portion so as to engage each of the pair of lugs of the female connecting portion within the enlarged socket end of each of the pair of angled slots of the male connecting portion to electrically couple the vaporizer assembly and the battery assembly.

FIG. 1 is a semi-transparent view of a battery assembly of an e-vapor device according to an example embodiment. Referring to FIG. 1, the battery assembly 100 includes a housing shell 108 that contains, inter cilia, a battery 110, a gauge 112 (e.g., gas gauge), and a circuit board 116 therein. The housing shell 108 may be formed of plastic and may optionally include a metal (e.g., aluminum) coating, although other suitable materials may be used. A female connecting portion 106 (e.g., battery connector) is disposed at a proximal end of the housing shell 108, while an end cap 118, a first contact 120 (e.g., positive contact), and a second contact 122 (e.g., common contact) are disposed at an opposing, distal end of the housing shell 108. In an example embodiment, the female connecting portion 106 is welded to the housing shell 108. For instance, an outer surface of the female connecting portion 106 may be welded to an inner surface of the proximal end of the housing shell 108.

The battery assembly 100 has a proximal end (adjacent to the female connecting portion 106) with a cylindrical shape that transitions into a triangular form at the opposing, distal end (adjacent to the second contact 122). For instance, the opposing, distal end may have a cross-sectional shape that resembles a Reuleaux triangle. A Reuleaux triangle is a shape formed from the intersection, of three circles, each having its center on the boundary of the other two. The battery assembly 100 may also have a slanted end face (relative to the longitudinal axis of the battery assembly 100). However, it should be understood that example embodiments may have other configurations and are not limited to the above forms.

Figure 2:
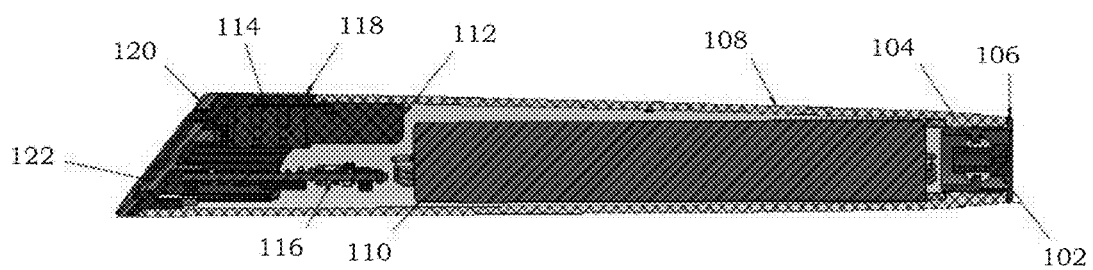
FIG. 2 is a cross-sectional view of the battery assembly of FIG. 1.

FIG. 2 is a cross-sectional view of the battery assembly of FIG. 1. Referring to FIG. 2, the battery assembly 100 may increase in size from the proximal end (adjacent to the female connecting portion 106) to the opposing, distal end (adjacent to the second contact 122). The diameter of the proximal end and the overall length of the battery assembly 100 may be about 9.50 mm and 100.9 mm, respectively, although example embodiments are not limited thereto. A female anode 102 (e.g., battery anode) and a female insulating member 104 (e.g., gasket ring) may be disposed within the female connecting portion 106. The female insulating member 104 may be an annular structure, with the female anode 102 extending therethrough. For instance, the female anode 102 may be arranged concentrically within the female connecting portion 106 while being electrically isolated therefrom via the female insulating member 104. A light article 114 (e.g., light pipe) may be disposed in the distal end of the battery assembly 100. The light article 114 may be configured to emit a light that is visible to an adult vaper based on the state of the e-vapor device. In an example embodiment, the light article 114 may emit a light of a first color during vaping, a light of a second color when the battery 110 is running low, and/or a light of a third color when the battery 110 is being charged. In lieu of (or in addition to) colored lights, the light article 114 may emit a flashing light and/or a pattern of lights as a status indicator.

The light article 114 can be configured and arranged such that the light emitted is visible from the end(s) and/or side(s) of the e-vapor device while having various shapes, sizes, quantities, and configurations. For instance, the emitted light may have a circular, elliptical, or polygonal shape (from one or more lights). In another instance, the emitted light may have a linear or annular form that is continuous or segmented. For example, the emitted light may appear as an elongated strip that extends along the body of the e-vapor device. In another example, the emitted light may be in the form of a ring that extends around the body of the e-vapor device. The ring may be in the section of the e-vapor device corresponding to the battery assembly and/or the vaporizer assembly.

Figure 3:
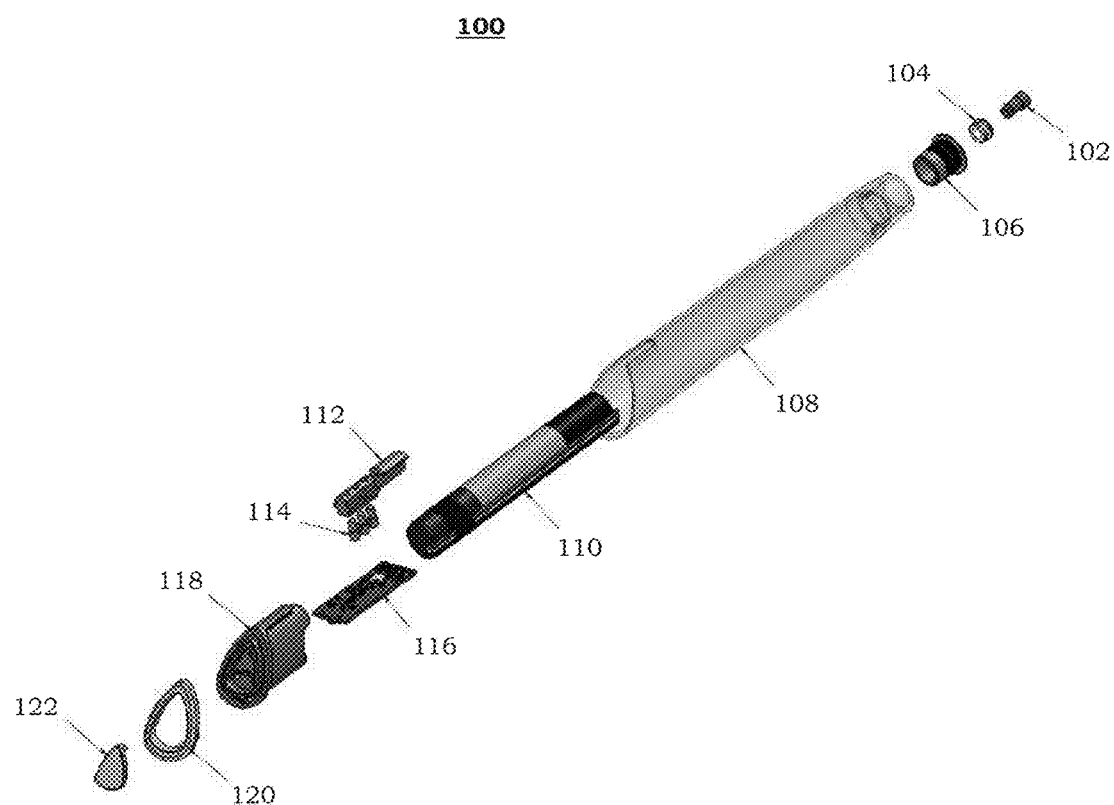
FIG. 3 is an exploded view of the battery assembly of FIG. 1.

FIG. 3 is an exploded view of the battery assembly of FIG. 1. Referring to FIG. 3, the female insulating member 104 is configured to be seated within the female connecting portion 106 (as shown in FIG. 2) via an annular groove on the outer surface of the female insulating member 104 and a corresponding annular ridge on the inner surface of the female connecting portion 106. The female anode 102 has an enlarged head part that is configured to abut the proximal end of the female insulating member 104 when inserted. The female insulating member 104 may be formed of silicone. The light article 114 is configured to engage with a distal part of the gauge 112. The end cap 118 may be formed of a translucent material or otherwise configured such that the light emitted by the light article 114 will be visible. The first contact 120 and the second contact 122 may be formed of stainless steel with a nickel-silver coating, although example embodiments are not limited thereto.

Figure 4:
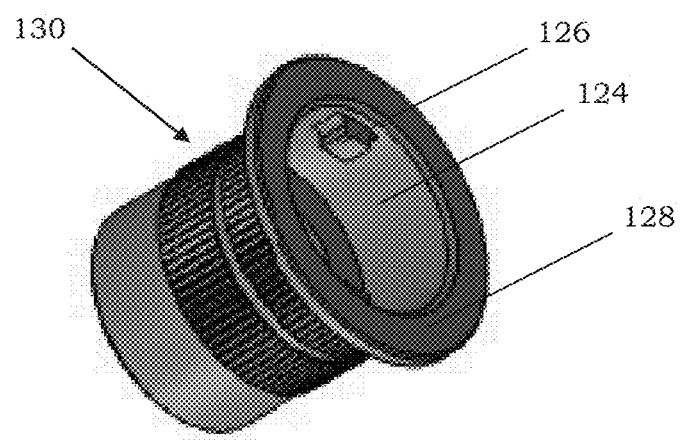
FIG. 4 is a perspective view of the female connecting portion of the battery assembly of FIG. 1.

FIG. 4 is a perspective view of the female connecting portion of the battery assembly of FIG. 1. Referring to FIG. 4, the female connecting portion 106 may be a generally cylindrical structure with an inner surface 124 and an opposing outer surface. A pair of lugs 126 may be disposed on the inner surface 124 of the female connecting portion 106 below the rim 128. Each of the lugs 126 may be in the form of a projection with a polygonal cross-section. Such a projection may be a rectangular-shaped protrusion (e.g., square-shaped protrusion), although other forms and shapes are also possible, such as a cylinder, spherical cap (e.g., hemisphere), etc. The pair of lugs 126 may be positioned so as to be 180° apart. In such a non-limiting embodiment, the pair of lugs 126 may directly face each other from opposite sides of the inner surface 124 of the female e connecting portion 106. However, it should be understood that more than two lugs 126 may be disposed on the inner surface 124 of the female connecting portion 106. For instance, three lugs 126 may be disposed on the inner surface 124 such that each lug 126 is 120° apart from the others.

A knurled pattern 130 may be formed on the outer surface of the female connecting portion 106 to facilitate the formation of a welded junction with a corresponding inner surface of the housing shell 108. The welded junction may include a reversed pattern on the inner surface of the housing shell 108 that conformally interfaces with the knurled pattern 130 on the outer surface of the female connecting portion 106. The knurled pattern 130 has a higher melting point than the reversed pattern on the inner surface of the housing shell 108. For example, the knurled pattern 130 on the outer surface of the female connecting portion 106 may be formed of metal, while the reversed pattern on the inner surface of the housing shell 108 may be formed of plastic. In such an instance, during welding, the plastic from the housing shell 108 (that interacts with the knurled pattern 130) undergoes localized melting and resolidifies from the molten state so as to take on the contours of the knurled pattern 130 on the outer surface of the female connecting portion 106 to form the reversed pattern.

The knurled pattern 130 may be in a form of at least one annular band that circumscribes a sidewall of the connector section. For instance, the knurled pattern 130 may be in the form of two annular bands of ridges that circumscribe the outer surface of the female connecting portion 106, although example embodiments are not limited thereto. The female connecting portion 106 is configured to be seated in the housing shell 108 (e.g., via thermal welding or ultrasonic welding) such that the undersurface of the rim 128 contacts the proximal end of the housing shell 108. As a result, the majority of the female connecting portion 106 (e.g., the outer surface and the knurled pattern 130) will not be visible in the battery assembly 100. In addition, when a vaporizer assembly (which will be subsequently discussed in further detail) is connected to the battery assembly 100, only the side edge of the rim 128 of the female connecting portion 106 will be visible. The welding of the connecting portions to the battery assembly and/or the vaporizer assembly is additionally discussed in U.S. Application No. 62/184,550, filed Jun. 25, 2015, the entire content of which is incorporated herein, by reference.

The female connecting portion 106 is a monolithic structure. As a result, the lugs 126 and the knurled pattern are integrally-formed parts of the female connecting portion 106 rather than being separate structures that are affixed to the inner surface 124 and the outer surface, respectively, of the female connecting portion 106. The female connecting portion 106 may be formed of a conductive material. For instance, the female connecting portion 106 may be formed from a single piece of brass. In such a non-limiting embodiment, the brass may optionally include a nickel-silver coating. In one instance, the nickel-silver coating may include a base plating of nickel (e.g., 1-2 μm) and a top plating of silver (e.g., 0.08-0.2 μm). Furthermore, the female connecting portion 106 may be a cathode, although example embodiments are not limited thereto.

Figure 5:
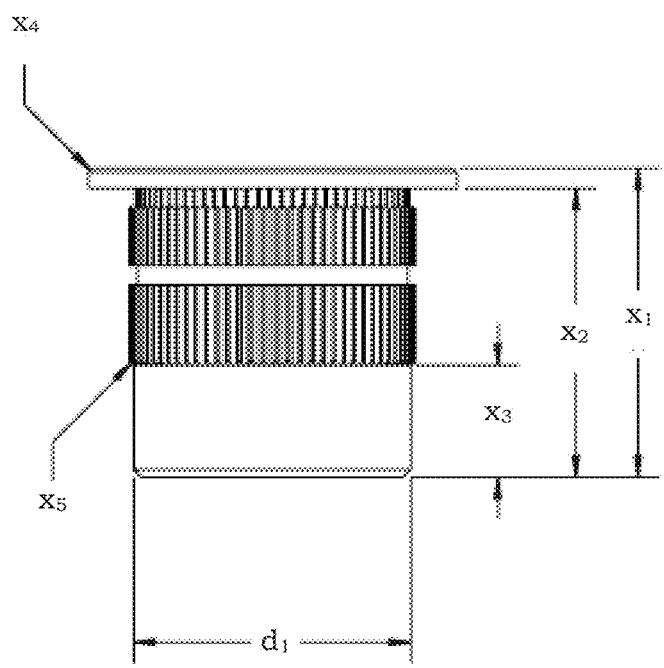
FIG. 5 is a side view of the female connecting portion of FIG. 4.

FIG. 5 is a side view of the female connecting portion of FIG. 4. Referring to FIG. 5, the knurled pattern 130 may be made of a series of straight ridges. The series of straight ridges may be parallel to a longitudinal axis of the female connecting portion 106. In addition, the series of straight ridges of the knurled pattern 130 may be perpendicular to the rim 128 of the female connecting portion 106. However, it should be understood that the ridges may have other orientations. For instance, the ridges may be angled (e.g., helical pattern that spirals around the outer surface of the female connecting portion 106 or part of such a pattern). In another instance, the ridges may intersect each other so as to have a criss-crossed configuration (e.g., diamond pattern).

The series of ridges of the knurled pattern 130 may be in the form of two annular bands that circumscribe the outer surface of the female connecting portion 106, although example embodiments are not limited thereto. In such a non-limiting embodiment, the annular bands have the same orientation for the ridges. For instance, the annular bands may have only straight ridges. Alternatively, the annular bands have different orientations for the ridges. For instance, in an example with two annular bands, the band closer to the rim 128 may have angled ridges, while the other band may have straight ridges. In addition, the series of ridges of the knurled pattern 130 do not need to fully circumscribe the outer surface of the female connecting portion 106. Rather, the annular band(s) of ridges may be interrupted with evenly-spaced intervals of unridged sections. Furthermore, the ridged and unridged sections of one band may be staggered with the ridged and unridged sections of an adjacent band.

The knurled pattern 130 may include between 40 to 60 teeth per inch (TPI). The knurled pattern 130 may also have a depth between 0.2 to 0.4 mm (e.g., depth of grooves between ridges). An undercut region may be formed adjacent to the rim 128. Although the undercut region is shown as being ridged, it should be understood that the undercut region may alternatively be a plain segment (e.g., unridged surface) of the female connecting portion 106.

In FIG. 5, the dimension $x_1$ corresponds to a distance from the proximal end to the distal end of the female connecting portion 106. In an example embodiment, the dimension $x_1$ may be about 7.98 mm. The dimension $x_2$ corresponds to a distance from the undersurface of the rim 128 to the distal end of the female connecting portion 106. The dimension $x_2$ may be about 7.47 mm. The dimension $x_3$ corresponds to an unridged section that is adjacent to the distal end of the female connecting portion 106. The dimension $x_3$ may be about 2.90 mm. The dimension $x_4$ corresponds to an angled outer edge of the rim 128. The dimension $x_4$ may be about 0.10 mm×45°. The dimension $x_5$ corresponds to an angled distal edge of the annular band. The dimension $x_5$ may be about 0.10 mm×45° mm. The diameter $d_1$ corresponds to the distal end of the female connecting portion 106. The diameter $d_1$ may be about 7.14±0.04 mm. In addition, the diameter of the opening in the proximal end of the housing shell 108 (which receives the female connecting portion 106 during welding) may be the same as the diameter $d_1$ of the female connecting portion 106. However, it should be understood that example embodiments may have other suitable proportions and, thus, are not limited to the above values.

Figure 6:
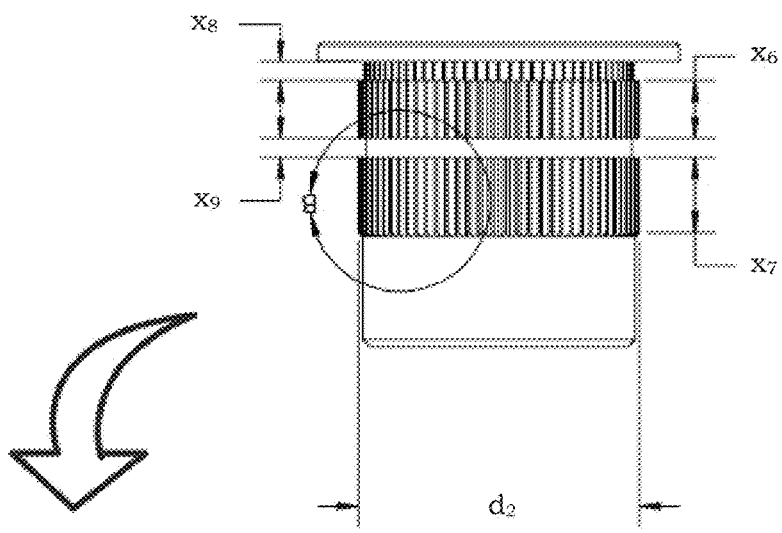
FIG. 6 is another side view with an enlarged sectional view of the female connecting portion of FIG. 4.
Figure 6:
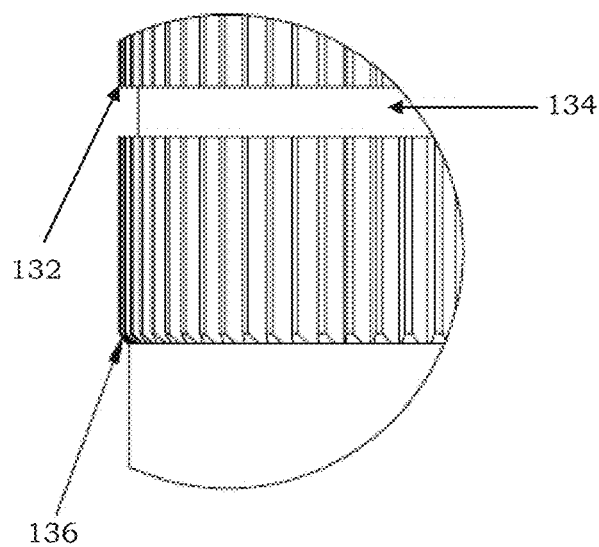

FIG. 6 is another side view with an enlarged sectional view of the female connecting portion of FIG. 4. Referring to FIG. 6, the dimension $x_6$ corresponds to the first knurling 132 (annular band adjacent to the rim 128) of the female connecting portion 106. The dimension $x_6$ may be about 1.50 mm. The dimension $x_7$ corresponds to the second knurling 136. The dimension $x_7$ may be about 1.97 mm. The dimension $x_8$ corresponds to the undercut region adjacent to the rim 128. The dimension $x_8$ may be about 0.50 mm. The dimension $x_9$ corresponds to the plain segment 134 between the first knurling 132 and the second knurling 136. The dimension $x_9$ may be about 0.50 mm. The diameter $d_2$ corresponds to the apex of the ridges of the knurled pattern 130. The diameter $d_2$ may be about 7.38±0.025 mm. However, it should be understood that example embodiments may have other suitable proportions and, thus, are not limited to the above values.

In the enlarged sectional view of FIG. 6, the knurled pattern 130 is shown more clearly as including a first knurling 132, a second knurling 136, and a plain segment 134 that spaces the first knurling 132 away from the second knurling 136. The plain segment 134 is an unridged, circular region that separates the first knurling 132 from the second knurling 136. The surface of the plain segment 134 may be lower than the unridged surface adjacent to the distal end of the female connecting portion 106. When the female connecting portion 106 is being welded to the housing shell 108, the melted plastic from the housing shell 108 will flow between the ridges of the first knurling 132 and the second knurling 136 and into the plain segment 134. Consequently, the resulting reversed, pattern on the inner surface of the housing shell 108 will have ridges/protrusions that conformally interface with the grooves/furrows of the knurled pattern 130 (and vice versa). In particular, the portion of the reversed pattern of the housing shell 108 that interfaces with the first knurling 132 and the second knurling 136 helps to restrict a rotation of the female connecting portion 106 within the housing shell 108. Additionally, the portion of the reversed pattern of the housing shell 108 that interfaces with (e.g., fills) the plain segment 134 helps to prevent an inadvertent removal of the female connecting portion 106 from the housing shell 108. Thus, the female connecting portion 106 may have held relatively securely in the proximal end of the housing shell 108 via the welded junction. For instance, the welded junction may be configured to withstand a tensile force of at least 250 N (e.g., 350 N or more).

Figure 7:
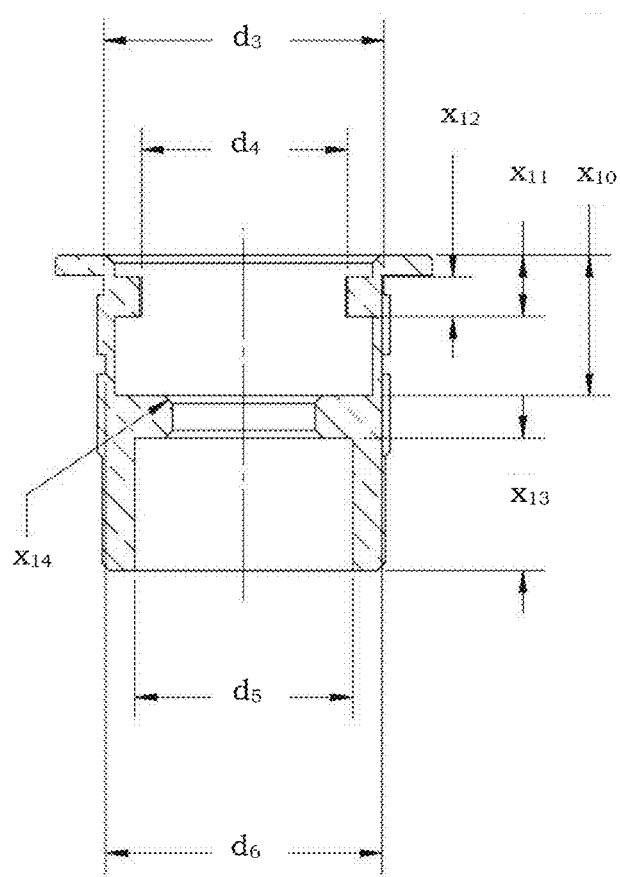
FIG. 7 is a cross-sectional view of the female connecting portion of FIG. 4.

FIG. 7 is a cross-sectional view of the female connecting portion of FIG. 4. Referring to FIG. 7, the diameter $d_3$ corresponds to an outer surface of the female connecting portion 106 that is adjacent to the rim 128. The diameter $d_3$ may be about 7.07 mm. The diameter $d_4$ corresponds to the opposing surfaces of the lugs 126. The diameter $d_4$ may be about 5.20 mm. The diameter $d_5$ corresponds to an inner surface at a distal end of the female connecting portion 106. The diameter $d_5$ may be about 5.50 mm. The diameter $d_6$ corresponds to a plain segment 134 of the outer surface (between the first knurling 132 and the second knurling 136) of the female connecting portion 106. The diameter $d_6$ may be about 6.97 mm. The dimension $x_{10}$ may be a distance to the annular ridge within the female connecting portion 106 from the proximal end. The dimension $x_{10}$ may be about 3.55±0.05 mm. The dimension $x_{11}$ may be a depth of the lugs 126 from the proximal end. The dimension $x_{11}$ may be about 1.55±0.025 mm. The dimension $x_{12}$ may be a height of the lugs 126. The dimension $x_{12}$ may be about 1.00 mm. The dimension $x_{13}$ may be a distance to the annular ridge within the female connecting portion 106 from the distal end. The dimension $x_{13}$ may be about 3.35 mm. The dimension $x_{14}$ may be an angled surface of the annular ridge within the female connecting portion 106. The dimension $x_{14}$ may be about 0.20 mm×45°. However, it should be understood that example embodiments may have other suitable proportions and, thus, are not limited to the above values.

Figure 8:
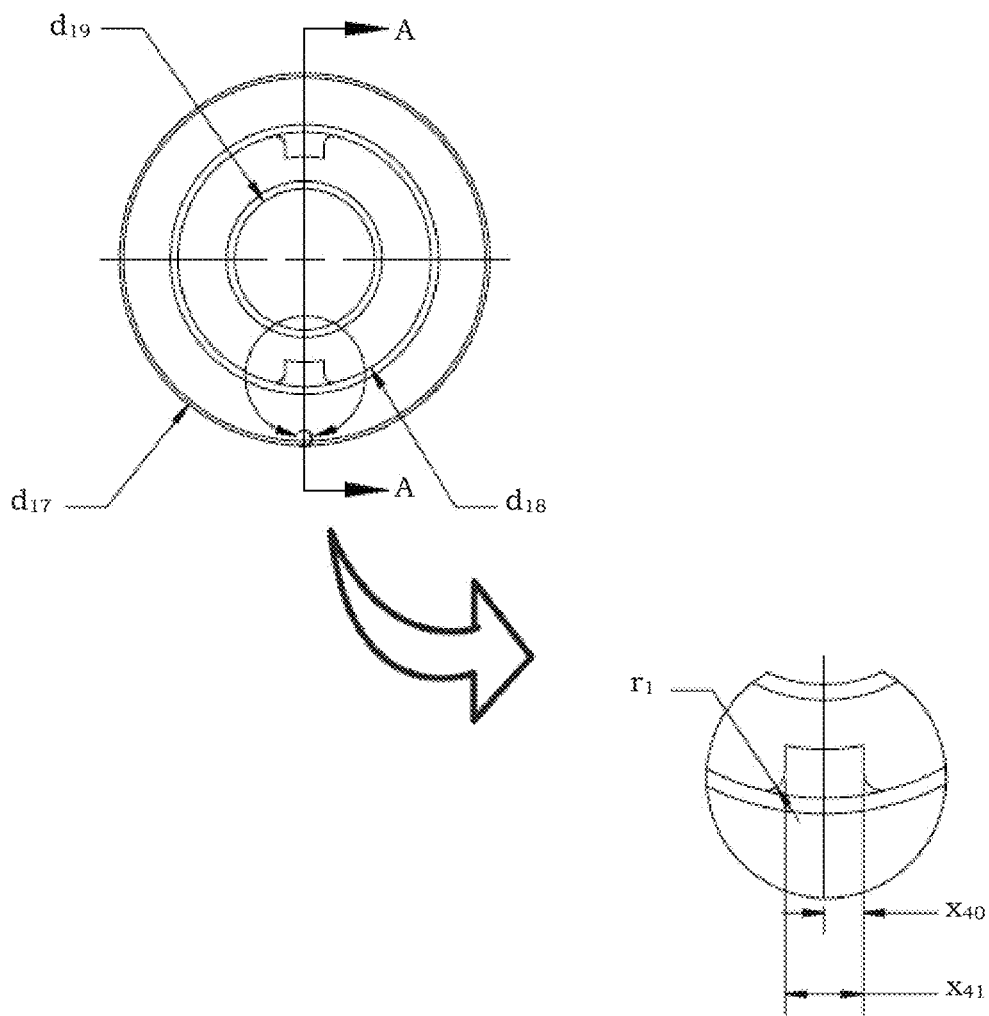
FIG. 8 is an end view with an enlarged sectional view of the female connecting portion of FIG. 4.

FIG. 8 is an end view with an enlarged sectional view of the female connecting portion of FIG. 4. Referring to FIG. 8, the diameter $d_{17}$ corresponds to an outer edge of the rim 128 of the female connecting portion 106. In an example embodiment, the diameter $d_{17}$ may be about 9.50 mm. The diameter $d_{18}$ corresponds to the inner surface 124 of the female connecting portion 106. The diameter $d_{18}$ may be about 6.50±0.05 mm. The diameter $d_{19}$ corresponds to the inner edge of an annular ridge (for seating the female insulating member 104) within the female connecting portion 106. The diameter $d_{19}$ may be about 3.60±0.05 mm. In the enlarged sectional view of FIG. 8, the radius $r_1$ corresponds to a curvature between the lugs 126 and the inner surface 124 of the female connecting portion 106. The radius $r_1$ may be about 0.25 mm. The dimensions $x_{40}$ and $x_{41}$ correspond to the lugs 126. The dimension $x_{40}$ may be about 0.50 mm. The dimension $x_{41}$ may be about 1.00 mm. However, it should be understood that example embodiments may have other suitable proportions and, thus, are not limited to the above values.

Figure 9:
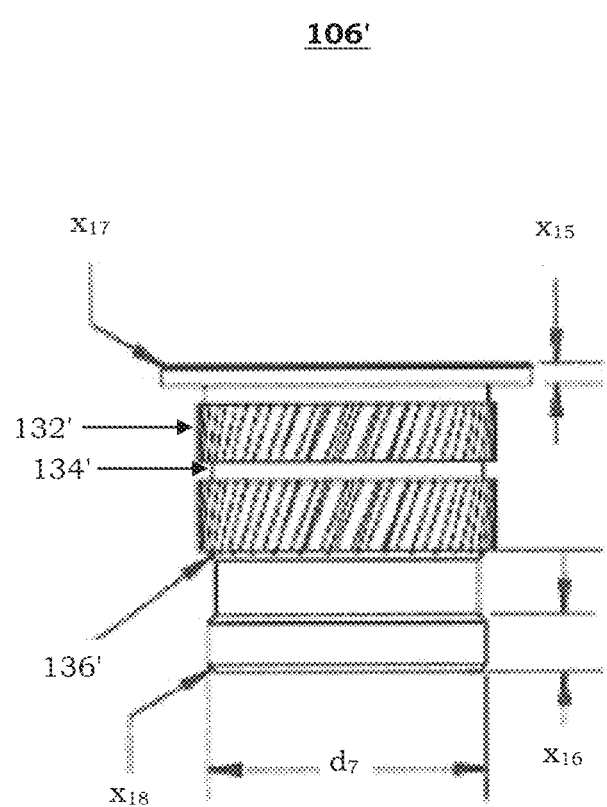
FIG. 9 is a side view of another female connecting portion with a knurled pattern according to an example embodiment.

FIG. 9 is a side view of another female connecting portion with a knurled pattern according to an example embodiment. Referring to FIG. 9, the female connecting portion 106' may include a knurled pattern that has a first knurling 132', a second knurling 136', and a plain segment 134' that spaces the first knurling 132' away from the second knurling 136'. The first knurling 132' and the second knurling 136' may include angled ridges. For instance, the angled ridges may be in the form of a right-hand spiral. However, it should be understood that other suitable configurations are also possible for the ridges (e.g., left-hand spiral, criss-cross pattern). The plain segment 134' is an unridged, circular region that separates the first knurling 132' from the second knurling 136'.

The dimension $x_{15}$ corresponds to a thickness of the rim. The dimension $x_{15}$ may be about 0.51 mm. The dimension $x_{16}$ corresponds to a distal end of the female connecting portion 106'. The dimension $x_{16}$ may be about 1.52 mm. The dimension $x_{17}$ corresponds to an angled edge of the rim. The dimension $x_{17}$ may be about 0.20 mm×45°. The dimension $x_{18}$ corresponds to an angled edge of the distal end of the female connecting portion 106'. The dimension $x_{18}$ may be about 0.20 mm×45°. The diameter $d_7$ corresponds to a distal end of the female connecting portion 106'. The diameter $d_7$ may be about 7.14 mm. However, it should be understood that example embodiments may have other suitable proportions and, thus, are not limited to the above values.

Figure 10:
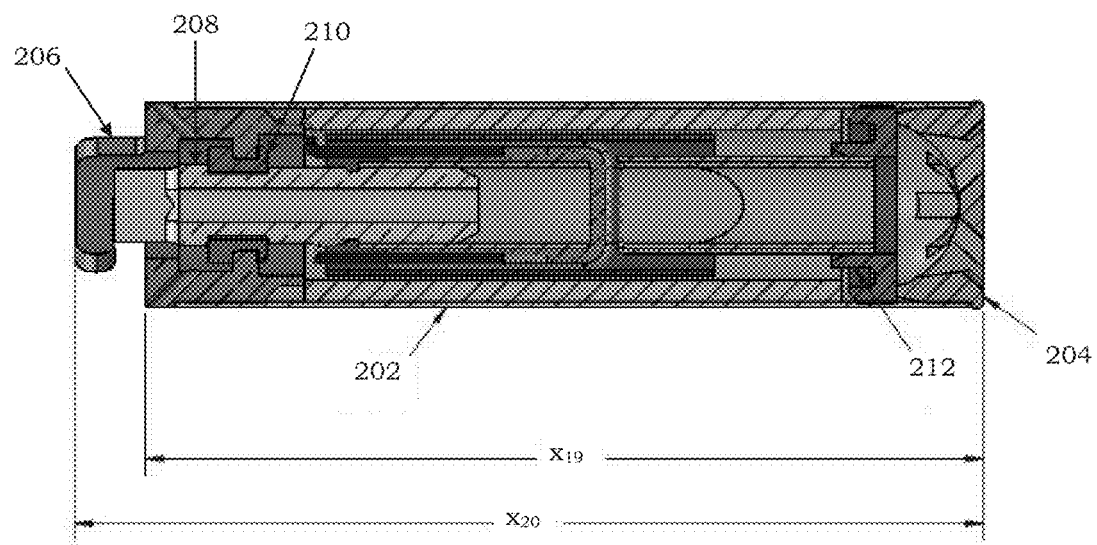
FIG. 10 is a cross-sectional view of a vaporizer assembly of an e-vapor device according to an example embodiment.

FIG. 10 is a cross-sectional view of a vaporizer assembly of an e-vapor device according to an example embodiment. Referring to FIG. 7, the vaporizer assembly 200 includes a housing barrel 202 with a proximal end and an opposing, distal end. The housing barrel 202 may be formed of metal (e.g., stainless steel), although other suitable materials may be used. A mouthpiece 204 and a sealing ring 212 are disposed at the proximal end of the housing barrel 202, while a male connecting portion 206 (e.g., vaporizer connector) is disposed at the opposing, distal end of the housing barrel 202. A male anode 208 (e.g., post) and a male insulating member 210 (e.g., gasket ring) may be disposed within the male connecting portion 206. The male insulating member 210 may be an annular structure, with the male anode 208 extending therethrough. For instance, the male anode 208 may be arranged concentrically within the male connecting portion. 206 while being electrically isolated therefrom via the male insulating member 210. The male insulating member 210 and the sealing ring 212 may be formed of silicone. The dimension $x_{19}$ may be a length from the mouthpiece 204 to a rim of the male connecting portion 206. The dimension $x_{19}$ may be about 38.80 mm. The dimension $x_{20}$ may be a length from the mouthpiece 204 to a distal end of the male connecting portion 206. The dimension $x_{20}$ may be about 42.10 mm.

The vaporizer assembly 200 is configured to heat a pre-vapor formulation therein to generate a vapor that is drawn through the mouthpiece 204 when a negative pressure is applied. The battery assembly 100 is configured to power the vaporizer assembly 200. In this regard, the male connecting portion 206 is configured to engage with the female connecting portion 106 so as to electrically couple the vaporizer assembly 200 and the battery assembly 100. The combination of the male connecting portion 206 and the female connecting portion 106 may be referred to as a bayonet connector (e.g., double bayonet connector). A heater wire may be provided within the vaporizer assembly 200 to heat the pre-vapor formulation to generate the vapor. In an example embodiment, the heater wire may be coiled around a wick, and the wick may be in fluidic communication with a reservoir of the pre-vapor formulation. One end of the heater wire may be electrically connected to the male connecting portion 206 (which may function as a cathode), while the other end of the heater wire may be electrically connected to the male anode 208. The connection of the heater wire to the male connecting portion 206 and the male anode 208 may be achieved via spot welding.

Figure 11:
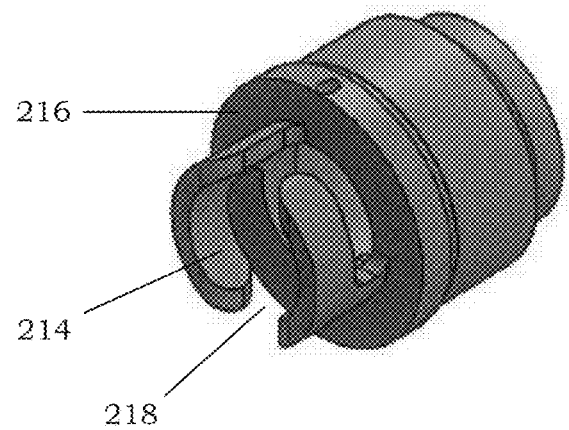
FIG. 11 is a perspective view of the male connecting portion of the vaporizer assembly of FIG. 10.

FIG. 11 is a perspective view of the male connecting portion of the vaporizer assembly of FIG. 10. Referring to FIG. 11, the male connecting portion 206 may include a pair of mating arms 214 extending from a rim 216 of the male connecting portion 206. The pair of mating arms 214 of the male connecting portion 206 are shaped to correspond to contours of the inner surface 124 of the female connecting portion 106 and to interact with the lugs 126 of the female connecting portion 106. Each of the mating arms 214 includes at least a trunk section and a branch section. The trunk section may be a vertical section, and the branch section may be a horizontal section. In an example embodiment, the mating arms 214 may be L-shaped. The vertical section of each mating arm 214 may also transition to the horizontal section via a curved elbow section. The vertical section of each of the mating arms 214 may extend longitudinally from an inner edge of the rim 216 so as to be even with an inner surface of the male connecting portion 206. The horizontal section may extend laterally from the vertical section and in a curvilinear manner so as to follow the inner diameter of the male connecting portion 206 while remaining parallel to the rim 216. The pair of mating arms 214 of the male connecting portion 206 may have tapered ends. For example, the terminus of the horizontal section may be rounded.

The pair of mating arms 214 and the rim 216 of the male connecting portion 206 define a pair of angled slots 218 therebetween. The angled slots 218 of the male connecting portion 206 are configured to interact with the lugs 126 of the female connecting portion 106. Each of the angled slots 218 may be viewed as having slot sections that are at an angle relative to each other. For instance, each of the pair of angled slots 218 may include a vertical section and a horizontal section. In an example embodiment, the pair of angled slots 218 may be L-shaped slots. Accordingly, the engagement of the mating arms 214 of the male connecting portion 206 and the lugs 126 of the female connecting portion 106 may involve a longitudinal movement of the lugs 126 into the vertical section of the angled slots 218 (e.g., insertion action) and a rotational movement of the lugs 126 into the horizontal section of the angled slots 218 (e.g., twisting action). A terminus of each of the pair of angled slots 218 includes an enlarged socket end to help receive and hold the lugs 126 in the engaged position.

An inlet to the vertical section of each of the angled slots 218 of the male connecting portion 206 may be in the form of a widened mouth by virtue of the tapered end of one mating arm 214 and the curved elbow section of the adjacent mating arm 214. In addition, the width of the vertical section (at its most narrow part) of each of the angled slots 218 may still be at least the width of each of the lugs 126. As a result, from the perspective of the female connecting portion 106, the lugs 126 of the female connecting portion 106 may be maneuvered into the vertical sections of the angled slots 218 of the male connecting portion 206 with relative ease and in an unobstructed manner. Stated differently, from the perspective of the male connecting portion 206, the mating arms 214 of the male connecting portion 206 may be maneuvered to receive the lugs 126 of the female connecting portion 106 into the vertical sections of the angled slots 218 with relative ease and in an unobstructed manner. Upon the movement of the lugs 126 into the vertical sections of the angled slots 218, the rim 128 of the female connecting portion 106 may be in physical contact with the rim 216 of the male connecting portion 206.

The horizontal section of each of the angled slots 218 of the male connecting portion 206 may include an entrance end and the enlarged socket end. The entrance end has a first height, and the enlarged socket end has a second height, wherein the second height is greater than the first height. An inlet to the horizontal section of each of the angled slots 218 of the male connecting portion 206 may be in the form of a partially-widened mouth by virtue of the tapered end of a corresponding one of the mating arms 214. The partially-widened mouth may facilitate the initial maneuvering of a corresponding one of the lugs 126 into the horizontal section. The partially-widened mouth narrows down to the first height of the entrance end of the horizontal section. The first height of the entrance end of the horizontal section of each of the pair of angled slots 218 of the male connecting portion 206 is less than a height of the pair of lugs 126 of the female connecting portion 106. Thus, the initial movement of the lugs 126 to the termini of the angled slots 218 will be partially obstructed by the larger dimensions of the distal portions of the mating arms 214.

The pair of mating arms 214 are configured to undergo a resilient deformation from an original position to a flexed position that is away from the rim 216 of the male connecting portion 206 when the pair of lugs 126 of the female connecting portion 106 are being rotationally engaged with the pair of angled slots 218 of the male connecting portion 206. As a result of the resilient nature of the mating arms 214, the lugs 126 are able to move beyond the partially-obstructive first height of the entrance end of the horizontal section of each of the pair of angled slots 218 so as to allow a rotational engagement. In addition, the pair of mating arms 214 of the male connecting portion 206 are configured to resiliently return to the original position when the pair of lugs 126 of the female connecting portion 106 are seated within the enlarged socket end of each of the pair of angled slots 218 of the male connecting portion 206.

The second height of the enlarged socket end of the horizontal section of each of the pair of angled slots 218 of the male connecting portion 206 may correspond to a height of the pair of lugs 126 of the female connecting portion 106. Accordingly, when the lugs 126 are seated within the enlarged socket ends of the angled slots 218, the horizontal section of each of the mating arms 214 may be flush against the distal edge of a corresponding one of the lugs 126. In the seated arrangement, the mating arms 214 may also exert a resilient force on the lugs 126 so as to press the rim 128 of the female connecting portion 106 against the rim 216 of the male connecting portion 206, although example embodiments are not limited thereto. Furthermore, the seating of the lugs 126 within the enlarged socket ends of the angled slots 218 may produce an audible click when the mating arms 214 resiliently return (e.g., spring back) to their original position. Such an audible click may be beneficial as an indication to an adult vaper of a proper engagement between the male connecting portion 206 and the female connecting portion 106.

Each of the pair of angled slots 218 of the male connecting portion 206 may transition to the enlarged socket end via a concave arc on an underside of each of the pair of mating arms 214. For instance, the concave arc may be in the form of a curved slope on a surface of each of the mating arms 214 facing the rim 216. The curved slope may connect two surfaces (which may be in parallel) of each of the mating arms 214, although example embodiments are not limited thereto. In such a non-limiting embodiment, the two surfaces may be a first surface that corresponds to the entrance end of the horizontal section and a second surface that corresponds to the enlarged socket end. The curvature of the concave arc may be sufficient to temporarily lock each of the lugs 126 in their respective enlarged socket ends so as to preclude an inadvertent disengagement therefrom. Accordingly, once engaged, separating the male connecting portion 206 from the female connecting portion 106 will require a deliberate counter-rotation (e.g., untwisting action) to move the lugs 126 beyond the concave arc via a resilient deformation of the mating arms 214.

Although two mating arms 214 are shown in FIG. 11 and discussed in various examples, it should be understood that the number of mating arms 214 (and, thus, the number of angled slots 218) of the male connecting portion 206 can be adjusted accordingly based on the number of lugs 126 in the female connecting portion 106. For instance, when the female connecting portion 106 includes three lugs 126, the male connecting portion 206 may include three mating arms 214 and three angled slots 218.

The male connecting portion 206 is a monolithic structure. As a result, the mating arms 214 are integrally-formed parts of the male connecting portion 206 rather than being separate structures that are affixed to the rim 216 of the male connecting portion 206. The male connecting portion 206 may be formed of a conductive material. For instance, the male connecting portion 206 may be formed from a single piece of brass. In such a non-limiting embodiment, the brass may optionally include a nickel-silver coating. In one instance, the nickel-silver coating may include a base plating of nickel (e.g., 1-2 µm) and a top plating of silver (e.g., 0.08-0.2 µm). Furthermore, the male connecting portion 206 may be a cathode, although example embodiments are not limited thereto.

The male connecting portion 206 is configured to be seated in the housing barrel 202 such that the undersurface of the rim 216 contacts the distal end of the housing barrel 202. As a result, the majority of the male connecting portion 206 will not be visible in the vaporizer assembly 200. In addition, when the vaporizer assembly 200 is connected to the battery assembly 100, only the side edge of the rim 216 of the male connecting portion 206 will be visible.

Figure 12:
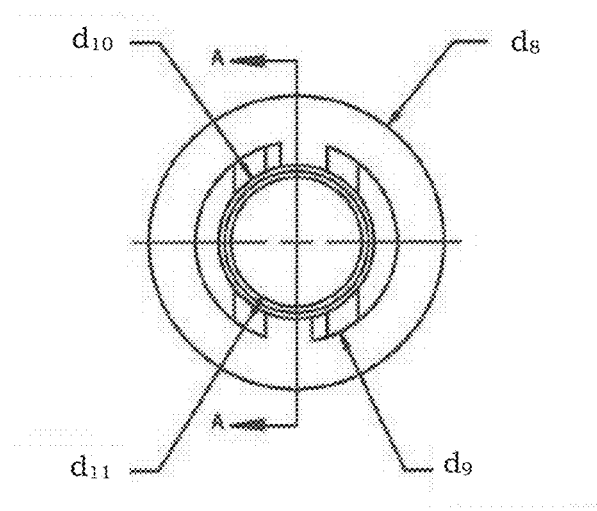
FIG. 12 is an end view of the male connecting portion of FIG. 11.

FIG. 12 is an end view of the male connecting portion of FIG. 11. Referring to FIG. 12, the mating arms 214 appear curved so as to resemble sections of a ring based on the end view. The diameter $d_8$ corresponds to an outer edge of the rim 216 of the male connecting portion 206. In an example embodiment, the diameter $d_8$ may be about 9.50 mm. The diameter $d_9$ corresponds to an outer edge of the mating arm 214. The diameter $d_9$ may be about 6.50 mm. The diameter $d_{10}$ corresponds to an inner edge of the mating arm 214. The diameter $d_{10}$ may be about 5.00±0.05 mm. The diameter $d_{11}$ corresponds to the inner edge of an annular ridge (for seating the male insulating member 210) within the male connecting portion 206. The diameter $d_{11}$ may be about 4.22±0.05 mm.

However, it should be understood that example embodiments may have other suitable proportions and, thus, are not limited to the above values.

Figure 13:
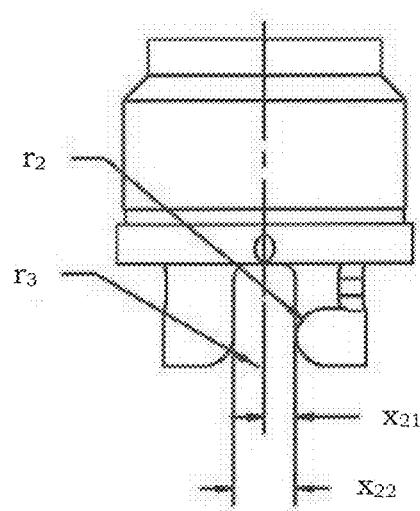
FIG. 13 is a side view of the male connecting portion of FIG. 11.

FIG. 13 is a side view of the male connecting portion of FIG. 11. Referring to FIG. 13, the radius $r_2$ corresponds to a curvature of a tapered end of the mating arm 214. The radius $r_2$ may be about 1.00 mm. The radius $r_3$ corresponds to a curvature of an outer elbow of the mating arm 214. The radius $r_3$ may be about 1.00 mm. The dimension $x_{21}$ corresponds to a distance between the inlet opening in the male connection portion 206 and the mating arms 214. The dimension $x_{21}$ may be about 1.00 mm. The dimension $x_{22}$ corresponds to a distance between the mating arms 214. The dimension $x_{22}$ may be about 2.00 mm. However, it should be understood that example embodiments may have other suitable proportions and, thus, are not limited to the above values.

Figure 14:
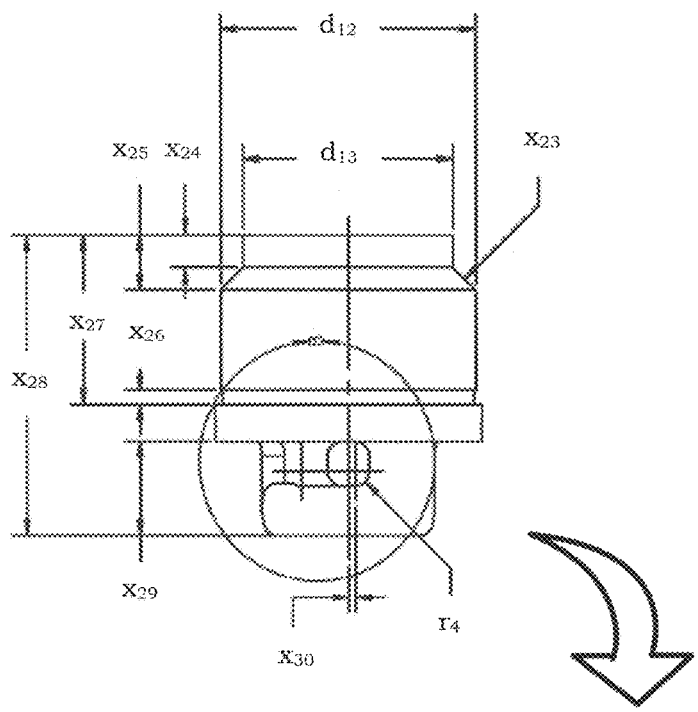
FIG. 14 is another side view with an enlarged sectional view of the male connecting portion of FIG. 11.
Figure 14:
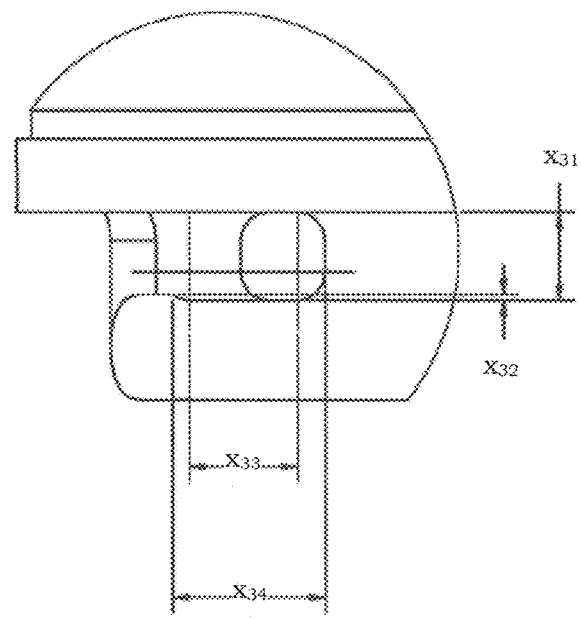

FIG. 14 is another side view with an enlarged sectional view of the male connecting portion of FIG. 11. Referring to FIG. 14, the diameter $d_{12}$ corresponds to a part of the male connecting portion 206 that will contact an inner surface of the housing barrel 202. The diameter $d_{12}$ may be about 9.08 mm. The diameter $d_{13}$ corresponds to a proximal end of the male connecting portion 206. The diameter $d_{13}$ may be about 7.50 mm. The dimension $x_{23}$ corresponds to an angled side surface of the male connecting portion 206. The dimension $x_{23}$ may be about 0.79 mm×45°. The dimensions $x_{24}$, $x_{25}$, and $x_{26}$ correspond to various aspects of the side surface of the male connecting portion 206. The dimensions $x_{24}$, $x_{25}$, and $x_{26}$ may be about 1.16 mm, 1.95 mm, and 0.50 mm, respectively. The dimension $x_{27}$ corresponds to a distance from the proximal end of the male connecting portion 206 to the undersurface of the rim 216. The dimension $x_{27}$ may be about 5.99 mm. The dimension $x_{28}$ corresponds to an overall length of the male connecting portion 206. The dimension $x_{28}$ may be about 10.59 mm. The dimension $x_{29}$ corresponds to a height of the mating arms 214. The dimension $x_{29}$ may be about 3.30±0.05 mm. The dimension $x_{30}$ may be about 0.25 mm. The radius $r_4$ corresponds to a curvature of an inner elbow of the mating arm 214. The radius $r_4$ may be about 0.50 mm.

In the enlarged sectional view of FIG. 14, the dimension $x_{31}$ corresponds to the height of the enlarged socket end of the angled slots 218. The dimension $x_{31}$ may be about 1.55 mm. The dimension $x_{32}$ corresponds to a difference between the height of the entrance end and the height of the enlarged socket end. The dimension $x_{32}$ may be about 0.10±0.025. The dimension $x_{33}$ corresponds to a linear section of the enlarged socket end. The dimension $x_{33}$ may be about 1.95 mm. The dimension $x_{34}$ corresponds to a length of the enlarged socket end including the concave arc. The dimension $x_{34}$ may be about 2.75 mm. In a non-limiting embodiment, the size of the enlarged socket end of the angled slots 218 may correspond to the size of the lugs 126 in order to provide a more fitted seating/locking arrangement. In such an instance, the dimensions $x_{31}$ and $x_{33}$ of FIG. 14 may coincide with the dimensions $x_{41}$ of FIG. 8 and $x_{12}$ of FIG. 7. However, it should be understood that example embodiments may have other suitable proportions and, thus, are not limited to the above values.

Figure 15:
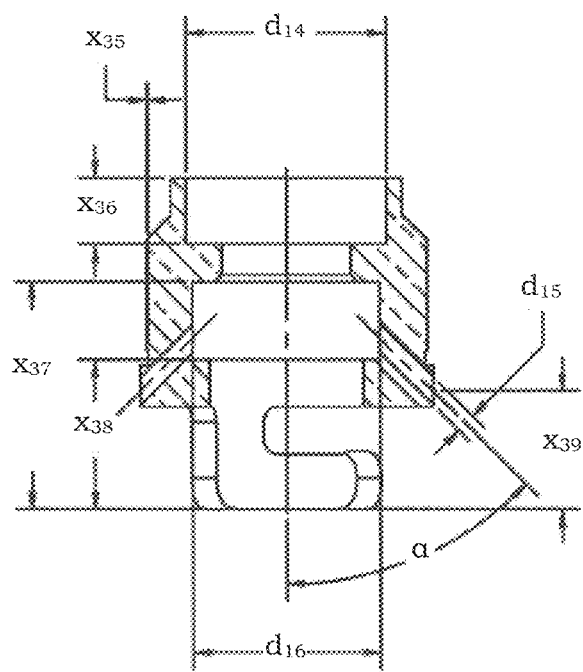
FIG. 15 is a cross-sectional view of the male connecting portion of FIG. 11.

FIG. 15 is a cross-sectional view of the male connecting portion of FIG. 11. Referring to FIG. 15, the diameter $d_{14}$ corresponds to the inner surface at the proximal end of the male connecting portion 206. The diameter $d_{14}$ may be about 6.50 mm. The diameter $d_{15}$ corresponds to the inlet opening in the male connecting portion 206. The diameter $d_{15}$ may be about 0.64 mm. The angle α corresponds to the positioning of the inlet opening in the male connecting portion 206. The angle α may be about 45°. The diameter $d_{16}$ corresponds to the mating arms 214. The diameter $d_{16}$ may be about 6.10 mm. The dimension $x_{35}$ corresponds to an undercut region. The dimension $x_{35}$ may be about 0.05 mm. The dimensions $x_{36}$, $x_{37}$, $x_{38}$, and $x_{39}$ may be about 2.10 mm, 7.29±0.07 mm, 4.79 mm, and 3.79 mm, respectively. However, it should be understood that example embodiments may have other suitable proportions and, thus, are not limited to the above values.

Figure 16:
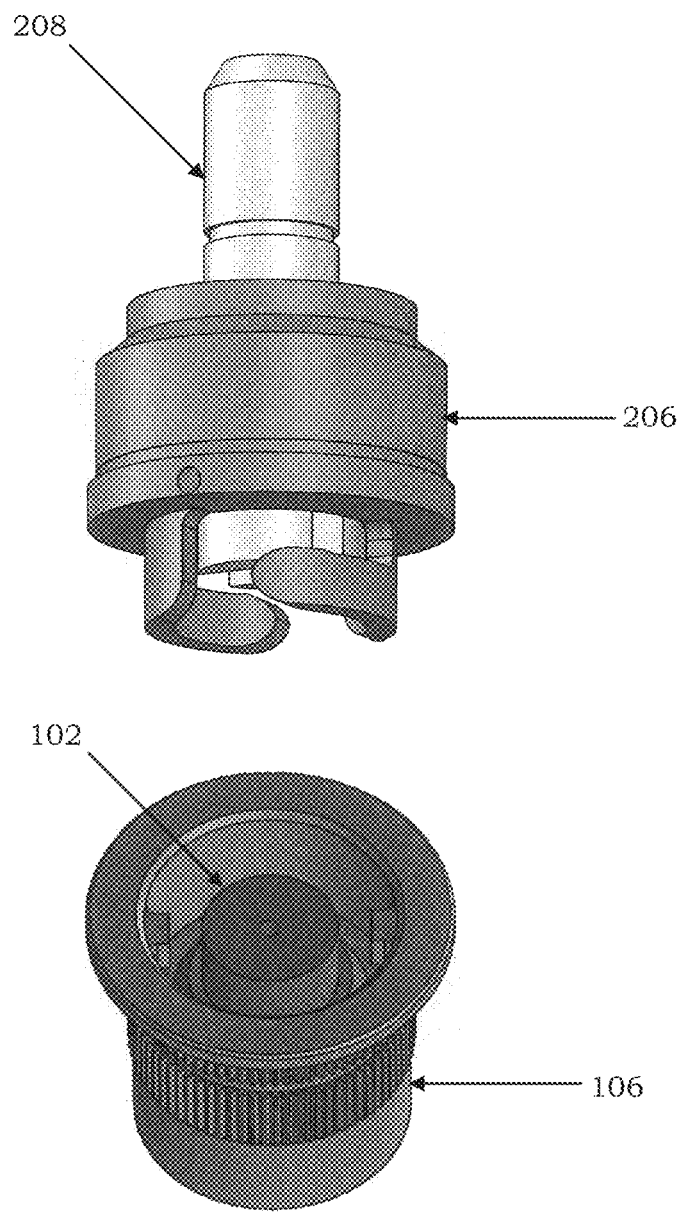
FIG. 16 is a perspective view of the male connecting arrangement of FIG. 10 and the female connecting arrangement of FIG. 1.

FIG. 16 is a perspective view of the male connecting arrangement of FIG. 10 and the female connecting arrangement of FIG. 1. Referring to FIG. 16, the male connecting arrangement includes a male anode 208 within the male connecting portion 206. A male insulating member (e.g., male insulating member 210) electrically isolates the male anode 208 from the male connecting portion 206. The female connecting arrangement includes a female anode 102 within the female connecting portion 106. A female insulating member (e.g., female insulating member 104) electrically isolates the female anode 102 from the female connecting portion 106. In an example embodiment, the female anode 102 includes a longitudinally-extending through hole with a diameter that is sufficiently small to permit a passage of air while precluding a passage of the pre-vapor formulation. In addition, the pair of mating arms 214 of the male connecting portion 206 may be configured to compress the female insulating member 104 when the pair of lugs 126 of the female connecting portion 106 are engaged with the pair of angled slots 218 of the male connecting portion 206.

Figure 17:
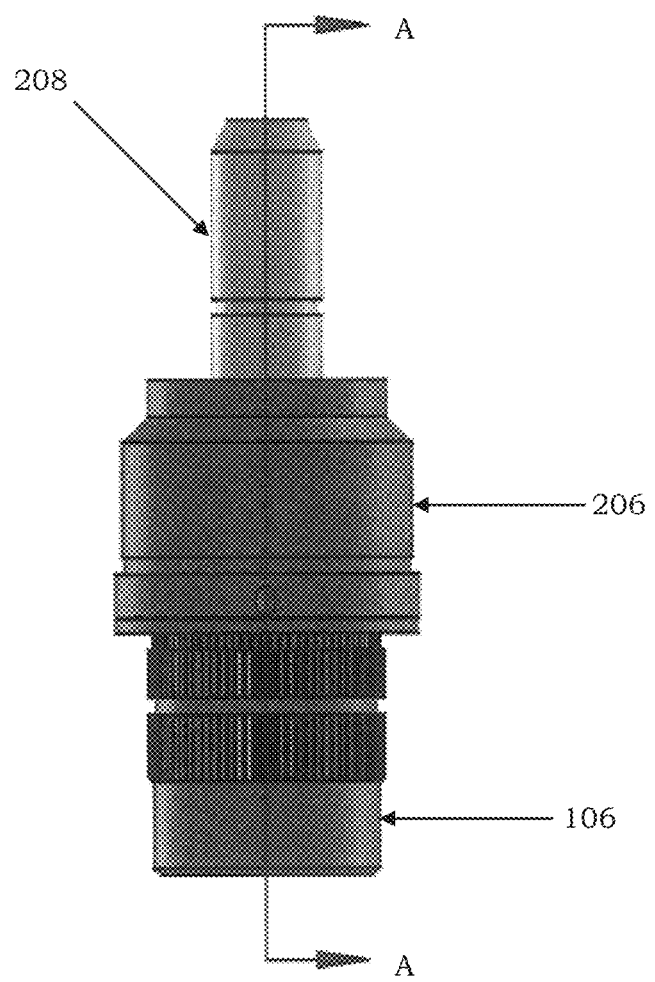
FIG. 17 is a side view of an engagement of the male connecting arrangement and the female connecting arrangement of FIG. 16.

FIG. 17 is a side view of an engagement of the male connecting arrangement and the female connecting arrangement of FIG. 16. Referring to FIG. 17, the engagement results in the rim 216 of the male connecting portion 206 being flush against the rim 128 of the female connecting portion 106. In addition, the engagement may result in both the female insulating member 104 and the male insulating member 210 being compressed by the female anode 102 and the male anode 208, respectively, as a result of the female anode 102 coming in physical contact with the male anode 208. When implemented in an e-vapor device, the male anode 208 and a majority of the male connecting portion 206 will be positioned within a housing barrel 202. Similarly, a majority of the female connecting portion 106 will be positioned within a housing shell 108. As a result, only the side edge of the rim 216 of the male connecting portion 206 and the side edge of the rim 128 of the female connecting portion 106 will be visible in the e-vapor device.

Figure 18:
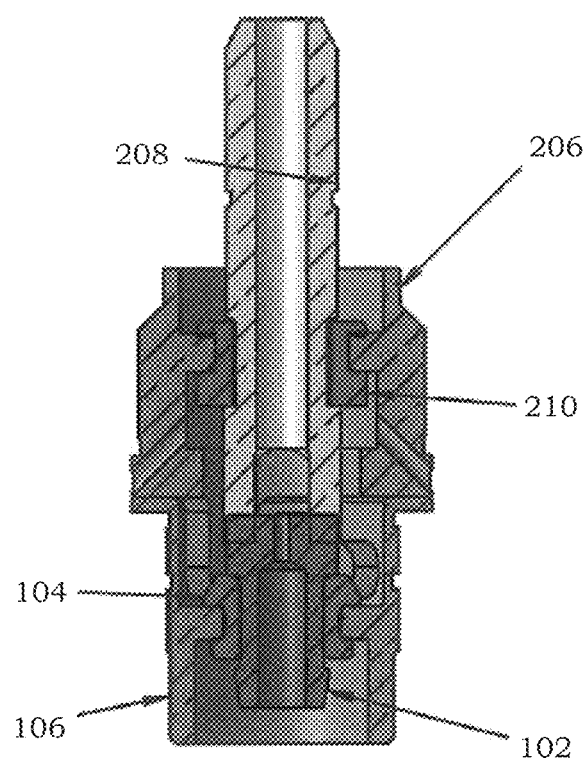
FIG. 18 is a cross-sectional view of the engagement of the male connecting arrangement and the female connecting arrangement of FIG. 17.

FIG. 18 is a cross-sectional view of the engagement of the male connecting arrangement and the female connecting arrangement of FIG. 17. Referring to FIG. 18, the engagement results in the male connecting portion 206 being in electrical contact with the female connecting portion 106 and the male anode 208 being in electrical contact with the female anode 102. The male insulating member 210 electrically isolates the male connecting portion 206 from the male anode 208, while the female insulating member 104 electrically isolates the female connecting portion 106 from the female anode 102. Although the male connecting portion 206 and the female connecting portion 106 are disclosed herein as cathodes, it should be understood that these structures may be alternatively configured as anodes. Conversely, the male anode 208 and the female anode 102 may be configured instead as cathodes. In addition, the connecting portions may be switched such that the male connecting portion 206 is secured to the battery assembly 100, while the female connecting portion 106 is secured to the vaporizer assembly 200. Furthermore, a knurled pattern also be provided on the outer surface of the male connecting portion 206 to facilitate the formation of a welded junction with the housing barrel 202 (e.g., plastic housing barrel).

Figure 19:
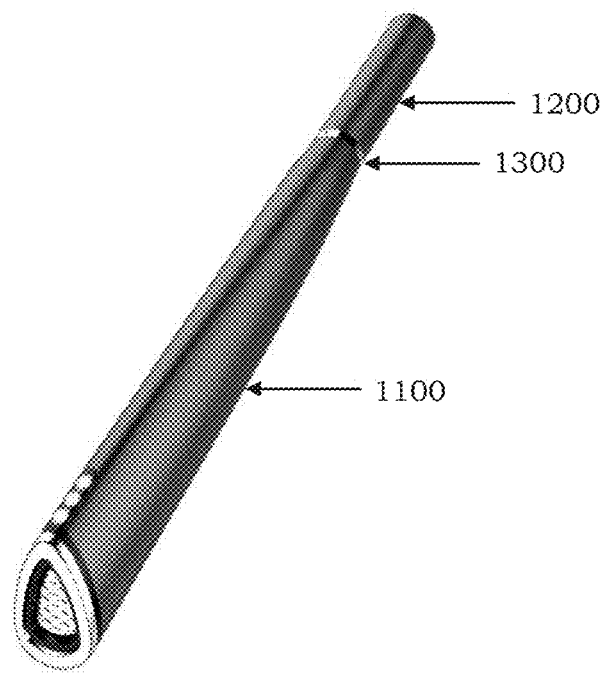
FIG. 19 is a perspective view of an e-vapor device according to an example embodiment.

FIG. 19 is a perspective view of an e-vapor device according to an example embodiment. Referring to FIG. 19, the e-vapor device 1000 includes a battery assembly 1100 that is detachably coupled to the vaporizer assembly 1200 via a connector 1300. The battery assembly 1100 may be as described supra in connection with the battery assembly 100. The vaporizer assembly 1200 may be as described supra in connection with the vaporizer assembly 200. The connector 1300 may include a hollow body with a knurled pattern on an outer surface of the hollow body. The knurled pattern may be in a form of at least one annular band that circumscribes a sidewall of the hollow body. The connector may also be a monolithic structure. The connector 1300 may include a male connecting portion and a female connecting portion. The male connecting portion may be as described supra in connection with the male connecting portion 206. The female connecting portion may be as described supra in connection with the female connecting portion 106.

In an example embodiment, the connector 1300 may be a double bayonet connector. A double bayonet connector for an e-vapor device may include a male connecting portion and a female connecting portion. The male connecting portion may include a pair of mating arms extending from a rim of the male connecting portion. The pair of mating arms and the rim may define a pair of angled slots therebetween. A terminus of each of the pair of angled slots includes an enlarged socket end. The female connecting portion includes an inner surface and a pair of lugs on the inner surface. The female connecting portion is configured to longitudinally and rotationally receive the pair of mating arms of the male connecting portion so as to engage each of the pair of lugs of the female connecting portion within the enlarged socket end of each of the pair of angled slots of the male connecting portion.

A method of manufacturing an e-vapor device may include welding a connector section to a body section of the e-vapor device to form a welded junction. The welded junction may include a knurled pattern on an outer surface of the connector section that conformally interfaces with a reversed pattern on an inner surface of the body section. The welding may be such that a material of the reversed pattern resolidifies from a molten state so as to take on contours of the knurled pattern.

The welding may be performed with a thermal or ultrasonic process. For instance, ultrasonic welding is a technique whereby high-frequency ultrasonic acoustic vibrations are locally applied to workpieces that are held together under pressure to create a solid-state weld. The vibrations may be at a frequency of about 15 to 40 kHz and create heat by way of friction between the workpieces to be joined. In ultrasonic welding, there are no connective bolts, nails, soldering materials, or adhesives necessary to bind the workpieces together.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. An e-vapor device comprising:
   a vaporizer assembly configured to heat a pre-vapor formulation to generate a vapor;
   a battery assembly configured to power the vaporizer assembly;
   a male connecting portion secured to one of the vaporizer assembly and the battery assembly, the male connecting portion including a pair of mating arms extending from a rim of the male connecting portion, the pair of mating arms and the rim defining a pair of angled slots therebetween, a terminus of each of the pair of angled slots including an enlarged socket end; and
   a female connecting portion secured to the other of the vaporizer assembly and the battery assembly, the female connecting portion including an inner surface and a pair of lugs on the inner surface, the female connecting portion configured to longitudinally and rotationally receive the pair of mating arms of the male connecting portion so as to engage each of the pair of lugs of the female connecting portion within the enlarged socket end of each of the pair of angled slots of the male connecting portion to electrically couple the vaporizer assembly and the battery assembly, at least one of the male connecting portion and the female connecting portion including a knurled pattern that conformally interfaces with a reversed pattern on a corresponding surface of at least one of the vaporizer assembly and the battery assembly.

2. The e-vapor device of claim 1, wherein the knurled pattern and the reversed pattern form a welded junction that is configured to withstand a tensile force of at least 250 N.

3. The e-vapor device of claim 1, wherein the knurled pattern has a higher melting point than the reversed pattern.

4. The e-vapor device of claim 1, wherein the knurled pattern is in a form of at least one annular band that circumscribes a sidewall of at least one of the male connecting portion and the female connecting portion.

5. The e-vapor device of claim 1, wherein the knurled pattern includes a first knurling, a second knurling, and a plain segment that spaces the first knurling away from the second knurling.

6. The e-vapor device of claim 1, wherein the knurled pattern is made of a series of straight ridges.

7. The e-vapor device of claim 1, wherein the knurled pattern includes between 40 to 60 teeth per inch (TPI) and has a depth between 0.2 to 0.4 mm.

8. A double bayonet connector for an e-vapor device, comprising:
   a male connecting portion including a pair of mating arms extending from a rim of the male connecting portion, the pair of mating arms and the rim defining a pair of angled slots therebetween, a terminus of each of the pair of angled slots including an enlarged socket end; and
   a female connecting portion including an inner surface and a pair of lugs on the inner surface, the female connecting portion configured to longitudinally and rotationally receive the pair of mating arms of the male connecting portion so as to engage each of the pair of lugs of the female connecting portion within the enlarged socket end of each of the pair of angled slots of the male connecting portion, each of the pair of angled slots including a vertical section and a horizontal section, the horizontal section including an entrance end with a first height and the enlarged socket end with a second height, the second height being greater than the first height, the first height of the entrance end of the horizontal section of each of the pair of angled slots of the male connecting portion being less than a height of the pair of lugs of the female connecting portion, and the second height of the enlarged socket end of the horizontal section of each of the pair of angled slots of the male connecting portion corresponding to a height of the pair of lugs of the female connecting portion.

9. The double bayonet connector of claim 8, wherein at least one of the male connecting portion and the female connecting portion includes a knurled pattern on a surface thereof.

10. An e-vapor device comprising:
a body section including a vaporizer assembly and a battery assembly, the vaporizer assembly configured to heat a pre-vapor formulation to generate a vapor, the battery assembly configured to power the vaporizer assembly; and
a connector section secured to the body section via a welded junction, the welded junction including a knurled pattern on an outer surface of the connector section that conformally interfaces with a reversed pattern on an inner surface of the body section, the connector section including a male connecting portion and a female connecting portion, the male connecting portion including a pair of mating arms extending from a rim of the male connecting portion, the pair of mating arms and the rim defining a pair of angled slots therebetween, a terminus of each of the pair of angled slots including an enlarged socket end, the female connecting portion including an inner surface and a pair of lugs on the inner surface, the female connecting portion configured to longitudinally and rotationally receive the pair of mating arms of the male connecting portion so as to engage each of the pair of lugs of the female connecting portion within the enlarged socket end of each of the pair of angled slots of the male connecting portion to electrically couple the vaporizer assembly and the battery assembly, each of the pair of angled slots including a vertical section and a horizontal section, the horizontal section including an entrance end with a first height and the enlarged socket end with a second height, the second height being greater than the first height, the first height of the entrance end of the horizontal section of each of the pair of angled slots of the male connecting portion being less than a height of the pair of lugs of the female connecting portion, and the second height of the enlarged socket end of the horizontal section of each of the pair of angled slots of the male connecting portion corresponding to a height of the pair of lugs of the female connecting portion.

11. The e-vapor device of claim 10, wherein the pair of mating arms of the male connecting portion are shaped to correspond to contours of the inner surface of the female connecting portion.

12. The e-vapor device of claim 10, wherein the pair of mating arms are configured to undergo a resilient deformation from an original position to a flexed position that is away from a rim of the male connecting portion when the pair of lugs of the female connecting portion are being rotationally engaged with the pair of angled slots of the male connecting portion, and the pair of mating arms of the male connecting portion are configured to resiliently return to the original position when the pair of lugs of the female connecting portion are seated within the enlarged socket end of each of the pair of angled slots of the male connecting portion.

13. An e-vapor device comprising:
a body section including a vaporizer assembly and a battery assembly, the vaporizer assembly configured to heat a pre-vapor formulation to generate a vapor, the battery assembly configured to power the vaporizer assembly;
a connector section secured to the body section via a welded junction, the welded junction including a knurled pattern on an outer surface of the connector section that conformally interfaces with a reversed pattern on an inner surface of the body section, the connector section including a male connecting portion and a female connecting portion, the male connecting portion including a pair of mating arms extending from a rim of the male connecting portion, the pair of mating arms and the rim defining a pair of angled slots therebetween, a terminus of each of the pair of angled slots including an enlarged socket end, the female connecting portion including an inner surface and a pair of lugs on the inner surface, the female connecting portion configured to longitudinally and rotationally receive the pair of mating arms of the male connecting portion so as to engage each of the pair of lugs of the female connecting portion within the enlarged socket end of each of the pair of angled slots of the male connecting portion to electrically couple the vaporizer assembly and the battery assembly;
a male anode within the male connecting portion;
a male insulating member electrically isolating the male anode from the male connecting portion;
a female anode within the female connecting portion; and
a female insulating member electrically isolating the female anode from the female connecting portion,
wherein the male connecting portion and the female connecting portion are cathodes.

* * * * *